United States Patent
Seki

(10) Patent No.: US 7,952,637 B2
(45) Date of Patent: May 31, 2011

(54) DISPLAY APPARATUS AND METHOD FOR DISPLAY BACKLIGHT CONTROL THEREOF

(75) Inventor: Hirotaka Seki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 11/354,665

(22) Filed: Feb. 15, 2006

(65) Prior Publication Data

US 2006/0187332 A1 Aug. 24, 2006

(30) Foreign Application Priority Data

Feb. 16, 2005 (JP) ................... 2005-039293

(51) Int. Cl.
*H04N 5/222* (2006.01)
*G03B 17/18* (2006.01)
*G09G 3/36* (2006.01)

(52) U.S. Cl. ................... 348/333.01; 396/282; 345/102

(58) Field of Classification Search ....... 348/207.1–376; 345/87, 102, 30, 55, 84; 396/280, 282, 374
See application file for complete search history.

(56) References Cited

U.S. PATENT DOCUMENTS

| 5,786,801 | A * | 7/1998 | Ichise | 345/102 |
| 6,714,245 | B1 * | 3/2004 | Ono | 348/333.13 |
| 7,144,136 | B2 * | 12/2006 | Drader et al. | 362/295 |
| 2001/0013854 | A1 * | 8/2001 | Ogoro | 345/102 |
| 2004/0196140 | A1 * | 10/2004 | Sid | 340/3.1 |

FOREIGN PATENT DOCUMENTS

| JP | 02-12125 | | 1/1990 |
| JP | 03-175418 | A | 7/1991 |
| JP | 10-333628 | A | 12/1998 |
| JP | 2000-132138 | A | 5/2000 |
| JP | 2000-298246 | A | 10/2000 |
| JP | 2001-215914 | A | 8/2001 |
| JP | 2003-289430 | A | 10/2003 |
| JP | 2004-135177 | A | 4/2004 |
| JP | 2005-316332 | A | 11/2005 |

* cited by examiner

*Primary Examiner* — Sinh Tran
*Assistant Examiner* — Mark Monk
(74) *Attorney, Agent, or Firm* — Canon USA Inc IP Division

(57) ABSTRACT

A display apparatus in which a long-time depression of a button for predetermined operations is discriminated, and a light-intensity of a display apparatus is modulated to a maximum or minimum intensity when a long-time depression is identified. This allows for setting a light intensity of a display apparatus by a simple operation.

13 Claims, 10 Drawing Sheets

DISPLAY APPARATUS AND METHOD FOR DISPLAY BACKLIGHT CONTROL THEREOF

This application claims priority from Japanese Patent Application No. 2005-039293 filed on Feb. 16, 2005, which is hereby incorporated by reference herein in its entirety.

BACKGROUND OF THE INVENTION

1. Field of the Invention

The present invention relates to an image capture apparatus having a display apparatus.

2. Related Background Art

There are already known apparatuses, such as a notebook personal computer, a digital camera or a personal digital assistant (PDA), equipped with a display apparatus having a light modulating function for changing, according to the desire of a user, an intensity of a backlight employed in a liquid crystal display panel.

Also as apparatuses having a similar function, there is known a display apparatus in which the back light intensity is not modulated gradually but large step by large step in response to a button operation. Such method for modulating the emission intensity will be explained in the following with reference to FIG. 2. In this method, the relationship between the light modulating step and the light intensity is changed from a curve B to a curve A. For example, a +2 step on the curve B is changed to a +2 step on the curve A, and the light intensity can thus be increased by a certain proportion without changing the light modulating step.

Also, various proposals have been made to automatically change the intensity of the backlight according to the level of the external light. As a representative proposal, there is known a technology utilizing a sensor for detecting brightness around the apparatus and an intensity modulating unit for modulating the intensity of the backlight according to the detected brightness, thereby controlling the intensity according to the illuminance. In the above-described equipment, however, the light intensity of the liquid crystal display apparatus is automatically changed even against the will of the user, after the lapse of a predetermined time for the purpose of electric power saving, and is therefore not very convenient for the user.

Also, in case of changing the light intensity of the liquid crystal display apparatus to a maximum or minimum light intensity, the light modulation has to be set on a menu screen or the like, and this prevents the user from changing the light intensity immediately.

Also, the above-described technology (disclosed in Japanese Patent Application Laid-open No. H02-12125) requires a sensor for detecting the brightness, thereby leading to an increase in the cost and dimension of the apparatus.

SUMMARY OF THE INVENTION

The present invention is directed to an image capture apparatus that minimizes the operation of the operator and allows changing a display apparatus immediately to a maximum or minimum light intensity.

According to one aspect of the present invention, an image capture apparatus includes a liquid crystal panel; a backlight unit configured to irradiate the liquid crystal panel with light from the rear side thereof; a controller modulating the intensity of the light of the backlight unit; a setting unit facilitating setting the light of the backlight unit at an arbitrary light intensity in accordance with an operation of an operator; an operation member; and an image capture unit, wherein the controller modulates the intensity of the light of the backlight unit to a predetermined intensity in accordance with a predetermined operation of the operation member.

DETAILED DESCRIPTION OF THE EMBODIMENTS

Figure 1:
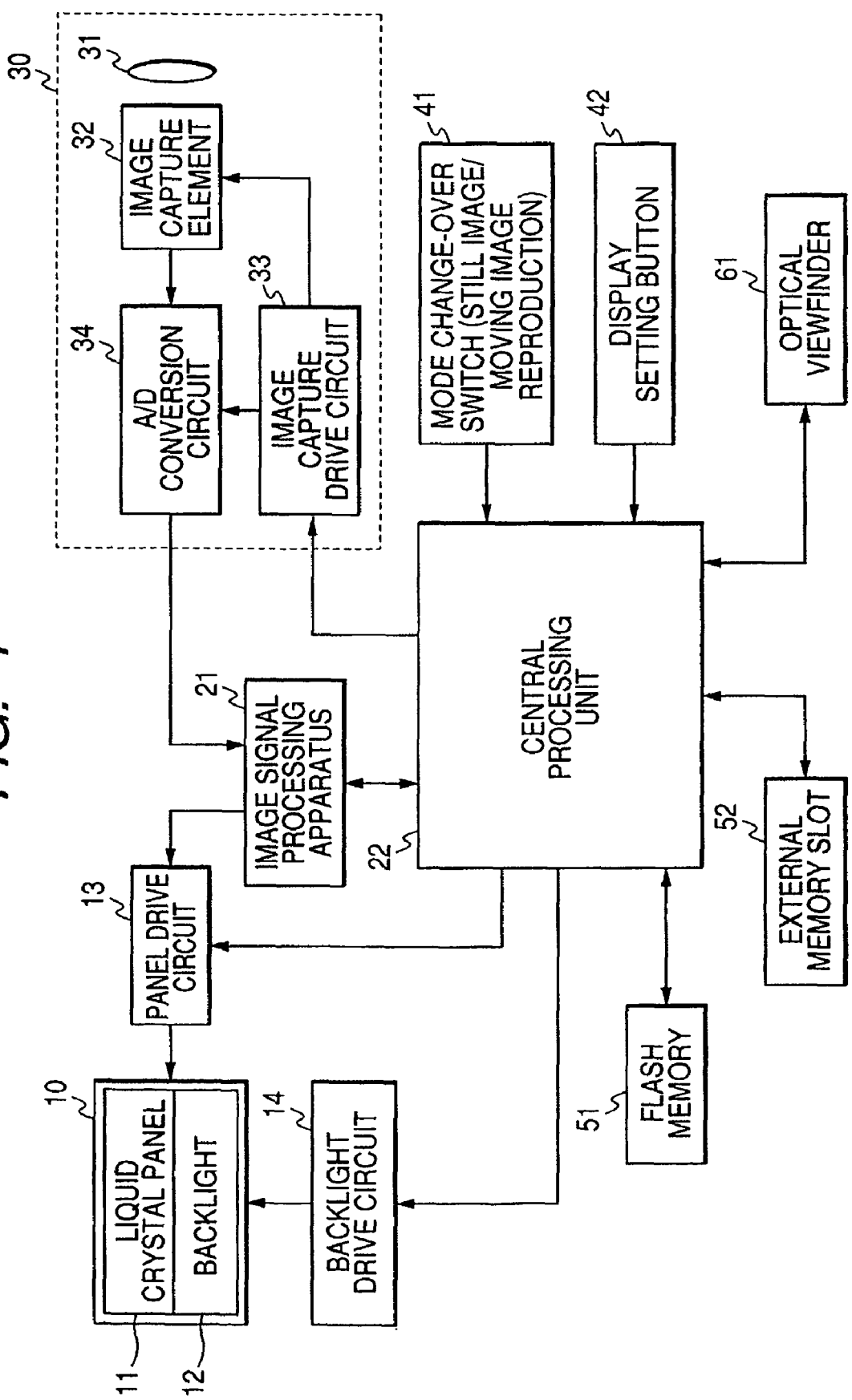
FIG. 1 is a block diagram of a digital camera in accordance with an embodiment of the present invention.
Figure 2:
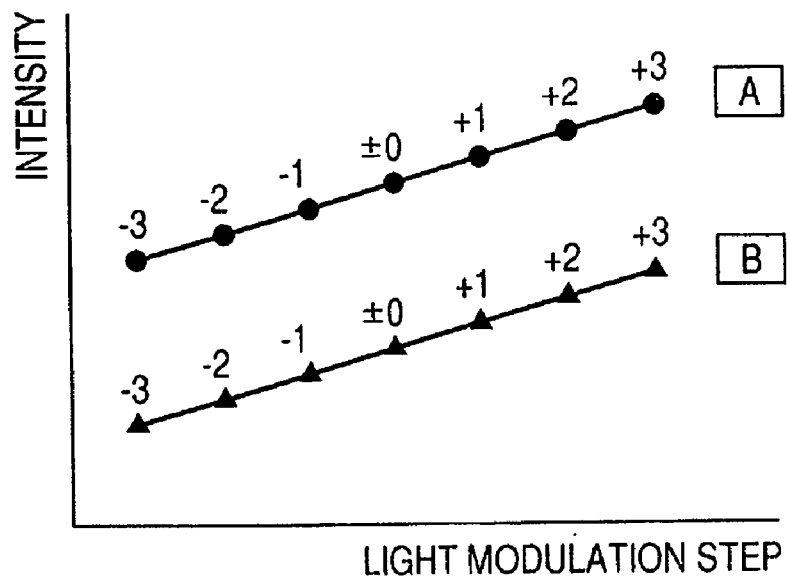
FIG. 2 is a chart showing a relationship between a light modulating step and a light intensity in a known technology.

FIG. 1 is a block diagram of a digital camera in accordance with a first embodiment of the present invention.

A liquid crystal display apparatus 10 includes a liquid crystal panel 11 and a backlight 12 for irradiating the liquid crystal panel 11 with light from a back side thereof. There are also provided a panel drive circuit 13 for driving the liquid crystal panel 11, and a backlight drive circuit 14 for driving the backlight 12.

An image signal processing apparatus 21 receives a control signal and an image signal from an A/D conversion circuit 34 or a central processing unit 22, and supplies the panel drive circuit 13 with an image signal. The central processing unit 22 controls various drive circuits such as the panel drive circuit 13, the backlight drive circuit 14, an image capture drive circuit 33, etc. The central processing unit 22 executes the control of the drive circuits in accordance with operations of a mode change-over switch 41, a display setting button 42, etc.

An image capture apparatus 30 includes a lens 31, an image capture element 32, the image capture drive circuit 33, and the A/D conversion circuit 34. The image capture lens 31 includes a barrier, an iris, a lens barrel, etc. (not shown in drawings). The image capture element 32 of a CCD type receives light transmitted by the lens 31 and converts the light into a voltage. The image capture drive circuit 33 drives the image capture element 32. The A/D conversion circuit 34 converts an output voltage (analog signal) outputted from the image capture element 32 into a digital signal of a predetermined number of bits. The image capture drive circuit 33 also controls a timing of A/D sampling of the A/D conversion circuit 34.

The mode change-over switch 41 selects, according to an operation thereof by the operator, either one of a still image capture mode, a moving image capture mode, and a reproduction mode. The display setting button 42 can change, according to a number of depressions thereof, the state of the liquid crystal display apparatus to either one of three states, namely (1) displaying image only, (2) an image display and a display of information for an image capture mode, a remaining capacity of a battery and the like, and (3) displaying nothing. Also, when the display setting button 42 is depressed for a predetermined time or longer (long-time depression), this causes a Power LCD Mode to be set, which mode features the present invention and will be explained below in more detail.

A memory 51 such as a flash memory stores various setting states, such as a power LCD flag indicating the state of the Power LCD Mode set by the operator, a control signal outputted to the backlight drive circuit 14 immediately before the Power LCD Mode is turned on (i.e., control signal to be set by a backlight intensity modulation setting in a step S104 to be explained below), a control signal outputted to the backlight drive circuit 14 for setting the backlight at a maximum or minimum intensity, and various setting status.

An external memory slot 52 capable of accepting various media such as an SD memory or a compact flash (trade name) so that the central processing unit 22 effects data read and write thereon. There is also provided an optical viewfinder 61.

Now, functions of an embodiment will be explained with reference to FIGS. 4 to 13.

Figure 4:
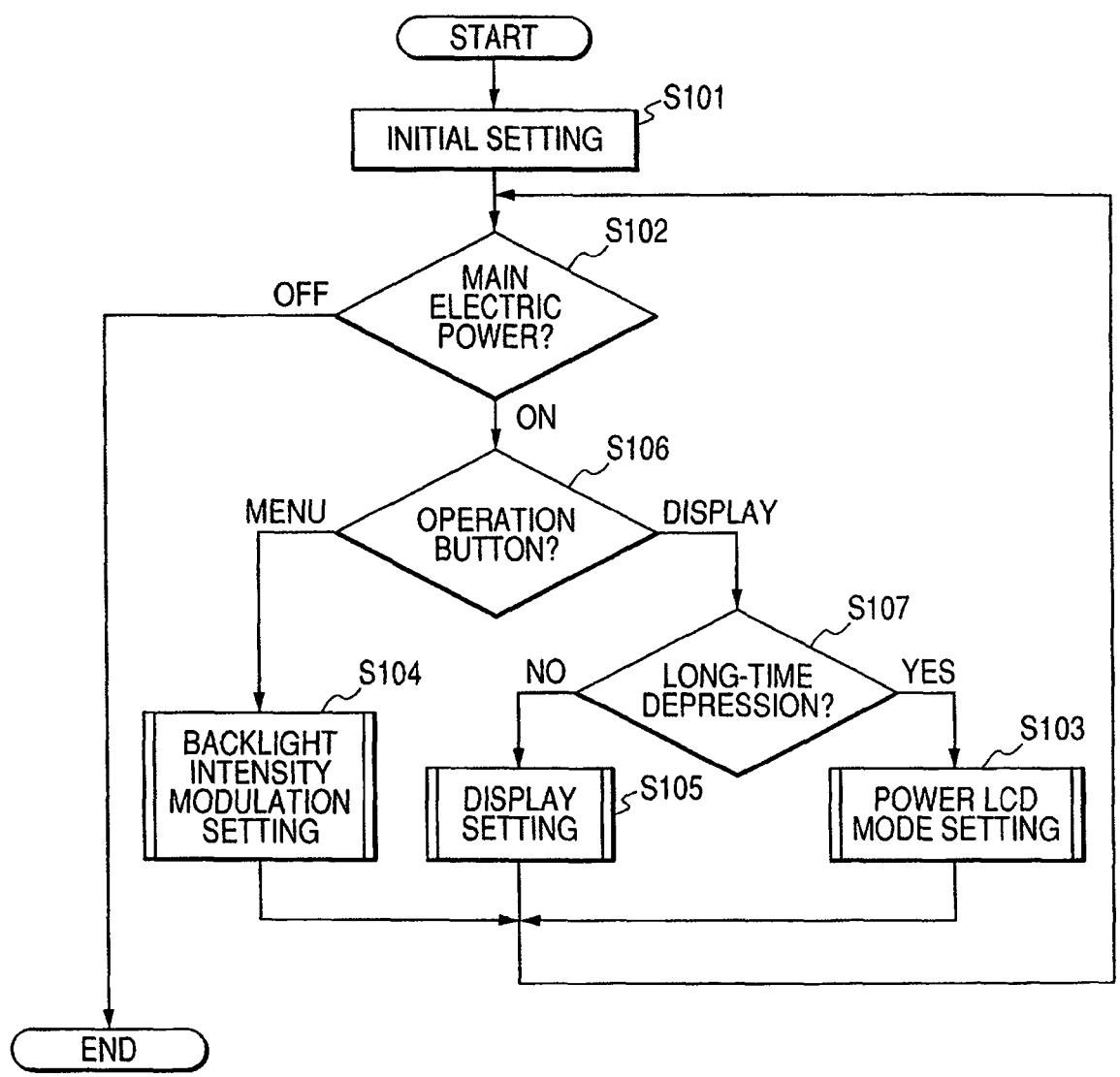
FIG. 4 is a flow chart showing an embodiment of the present invention.

FIG. 4 is a flow chart showing functions of the present embodiment. When a main power supply of a main body of the apparatus is turned on by the operator, there is a step S101 of executing a predetermined initialization. More specifically, a light intensity is set in accordance with a control signal set in a backlight intensity modulation setting step S104 to be explained below. Then, there is a step S102 of discriminating whether the main power supply is turned off, and, if identified as turned off, the sequence is terminated. If the main power supply is not turned off, there is a step S106 of discriminating a type of operation button operated by the operator. If an operation of the display setting button 42 is identified in step S106, then the sequence proceeds to a step S107.

There is a step S107 of measuring a time of depression of the display setting button 42, and, if a long-time depression for a predetermined time (for example one second) or longer, it is discriminated that a Power LCD Mode is selected, and a Power LCD Mode setting is executed at step S103. A value (for example a maximum or minimum value) set in the Power LCD Mode is stored until the main power supply is turned off, whereby the light intensity of the liquid crystal display apparatus 10 is retained. As the control signal therefore is not stored in the flash memory 51, the set intensity is, upon turning off the main power supply, reset to a default intensity. This process is executed because the image capturing situation generally changes after the main power supply is turned off. Details of setting of the Power LCD Mode will be explained with reference to FIG. 5.

If at step S107 it is discriminated that the depression time of the display setting button 42 is less than the predetermined time, the sequence proceeds a display setting step S105. A display setting process will be explained with reference to FIG. 8.

Also, if at step S106 it is discriminated that a MENU button is operated to select a backlight intensity modulation setting menu, there is the step S104 of executing a backlight intensity modulation setting. The backlight intensity modulation setting process will be explained with reference to FIG. 7.

In the above-described embodiment, since the Power LCD Mode and the display setting mode are changed over according to the depression time of the display setting button 42, there is now required no exclusive button for the Power LCD Mode, thereby achieving a decrease in the number of components of the digital camera and a size reduction of the equipment.

The digital camera involves various functional settings and operations in addition to steps S103-S105, but such settings and operations will be omitted from the description. After the subroutine operations in steps S103 to S105, the sequence returns to step S102.

Figure 3:
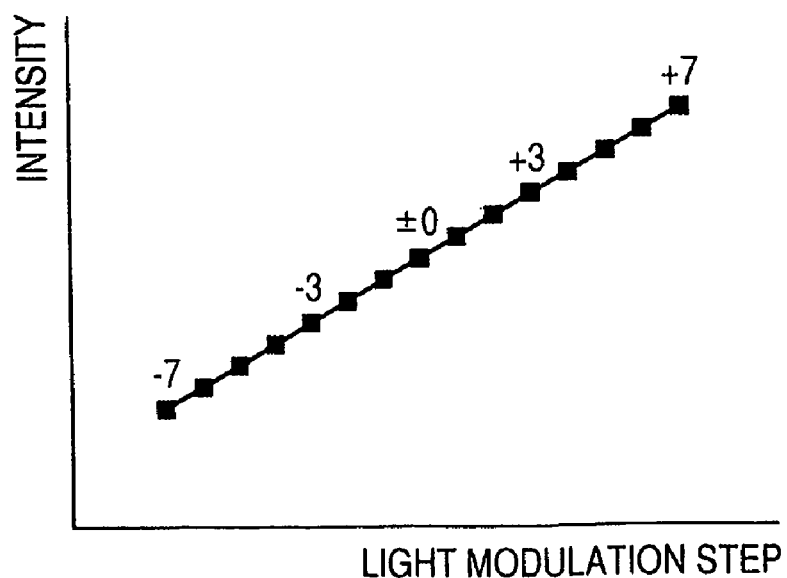
FIG. 3 is a chart showing a relationship between a light modulating step and a light intensity in the present invention.
Figure 5:
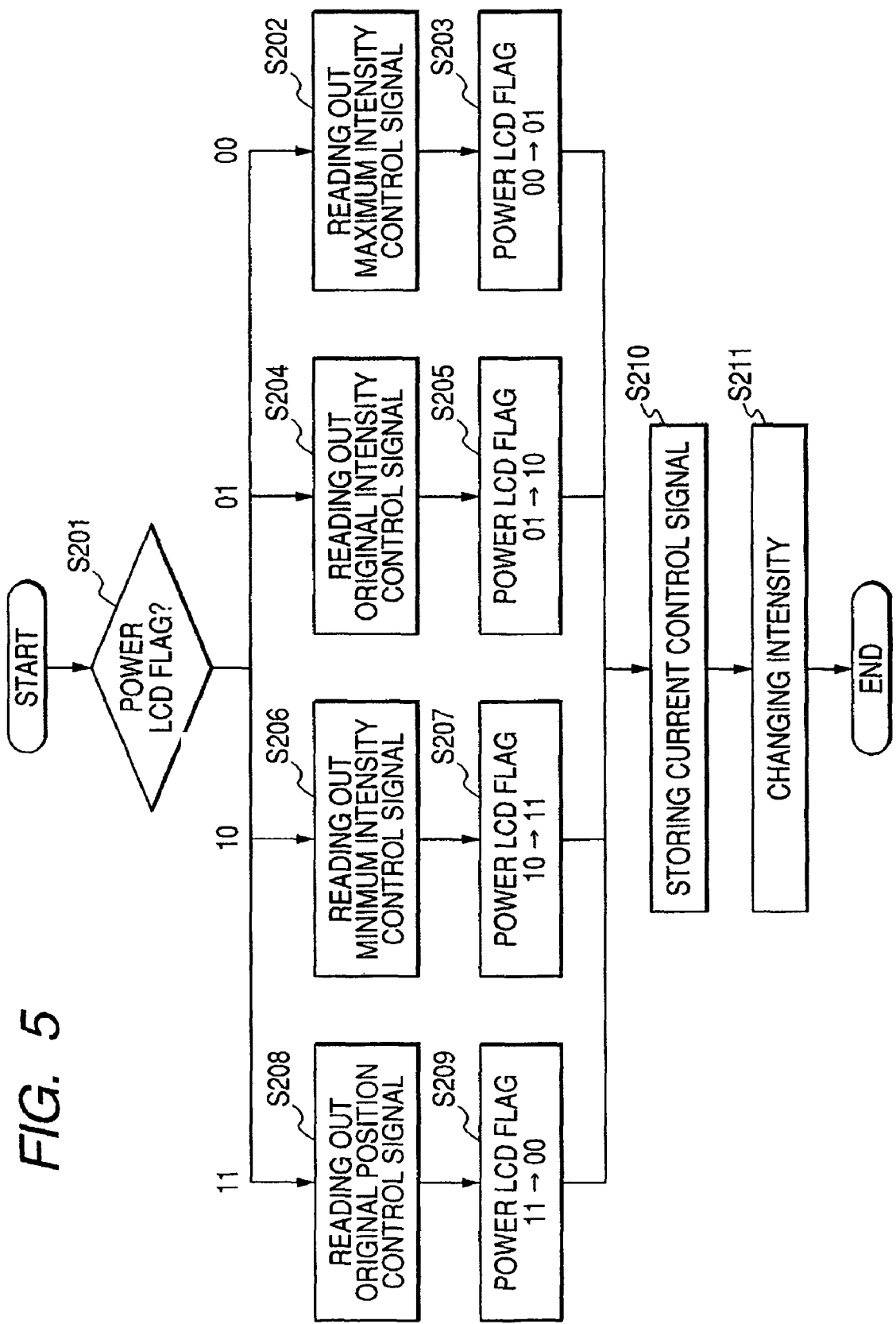
FIG. 5 is a flow chart showing a power LCD setting as a subroutine of FIG. 4.

FIG. 5 is a flow chart showing a Power LCD Mode setting subroutine in the step S103 in FIG. 4. When the Power LCD Mode setting is selected, the central processing unit 22 checks, in a step S201, a power LCD flag stored in the flash memory 51. The power LCD flag assumes one of four values, representing the following meanings respectively:

(1) 00: Backlight intensity is set at an intensity set in the modulation setting, and a value before the setting is a minimum value (−7 in FIG. 3) or a value set in the modulation setting;

(2) 01: Backlight intensity is set at a maximum value (+7 in FIG. 3) in a Power LCD Mode setting;

(3) 10: Backlight intensity is set at an intensity set in the modulation setting, and a value before the setting is a maximum value;

(4) 11: Backlight intensity is set at a minimum value in a Power LCD Mode setting.

In the case (1), a control signal stored in the flash memory 51, to be supplied to the backlight drive circuit 41 to shift the light intensity of the backlight 12 to the maximum intensity, is read, and a control signal for obtaining a maximum value is read from the power LCD memory (step S202). Then, "01" is overwritten in the power LCD flag (step S203), and the sequence proceeds to a step S210.

In the case (2), an original control signal before the setting (control signal set in a backlight intensity modulation setting of step S104 to be explained below), stored in the flash memory 51, is read therefrom (step S204), then "10" is overwritten in the power LCD flag (step S205), and the sequence proceeds to a step S210.

In the case (3), a control signal stored in the flash memory 51, to be supplied to the backlight drive circuit 41 to shift the light intensity of the backlight 12 to the minimum intensity, is read, a control signal for obtaining a minimum value is read from the power LCD memory (step S206), then "11" is overwritten in the power LCD flag (step S207) and the sequence proceeds to a step S210.

In the case (4), an original control signal before the setting (control signal set in a backlight intensity modulation setting of step S104 to be explained below), stored in the flash memory 51, is read therefrom (step S208), then "00" is overwritten in the power LCD flag (step S209) and the sequence proceeds to a step S210.

After the step S203, S205, S207 or S209, the sequence proceeds to a step S210 to store a current control signal, outputted to the backlight drive circuit 14, and then there is a step S211 of supplying the backlight drive circuit 14 with a control signal set in the step S202, S204, S206 or S208, thereby attaining a corresponding light intensity.

The light modulating step and change of the light intensity in the above-described operation will be explained with reference to FIG. 9. It is assumed that the light modulation is at an intermediate step. When the power LCD setting is selected by the operator, the light intensity is changed to +α steps (transition (1)), and a next operation returns the intensity to an intermediate position before the change (transition (2)). A next operation changes the intensity by $-\beta$ steps (transition (3)), and a next operation returns the intensity to the intermediate position (transition (4)).

Figure 9:
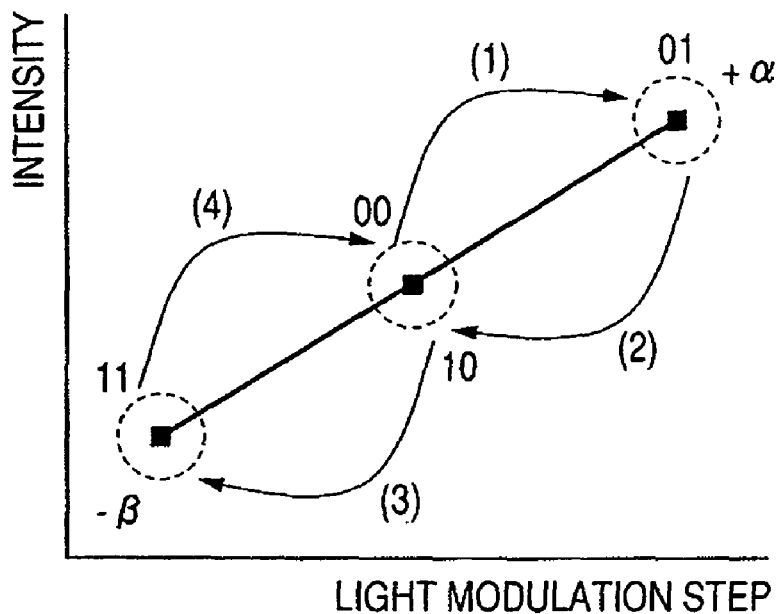
FIG. 9 is a chart showing an example of light intensity change in a power LCD setting.
Figure 10:
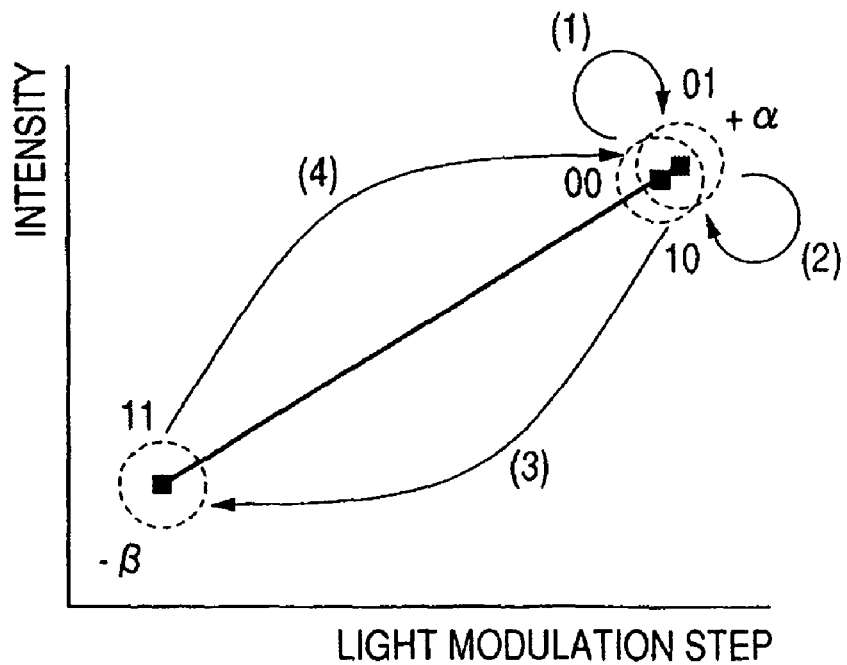
FIG. 10 is a chart showing an example of light intensity change in a power LCD setting.

FIG. 9 shows a Power LCD Mode setting operation when the backlight intensity is changed in the backlight intensity modulation setting. Also in this case, the transitions (1), (2), (3) and (4) are the same except that the intermediate intensity is replaced by a modulated light intensity. When the modulated intensity is already $+\alpha$ ($-\beta$), the transition (1) ((3)) appears to result in no apparent change in the light intensity, but such situation is considered acceptable in the present embodiment.

In the foregoing explanation, it is assumed that in step S202, the control signal is read for the maximum intensity, and in step S206, the control signal is read for the minimum intensity. However, such control signal need not necessarily be for the maximum or minimum intensity achievable in the backlight but can be for a light intensity of a certain magnitude. In FIG. 9, the intensities of $+\alpha$ and $-\beta$ steps need not be respectively maximum and minimum intensities.

Figure 11:
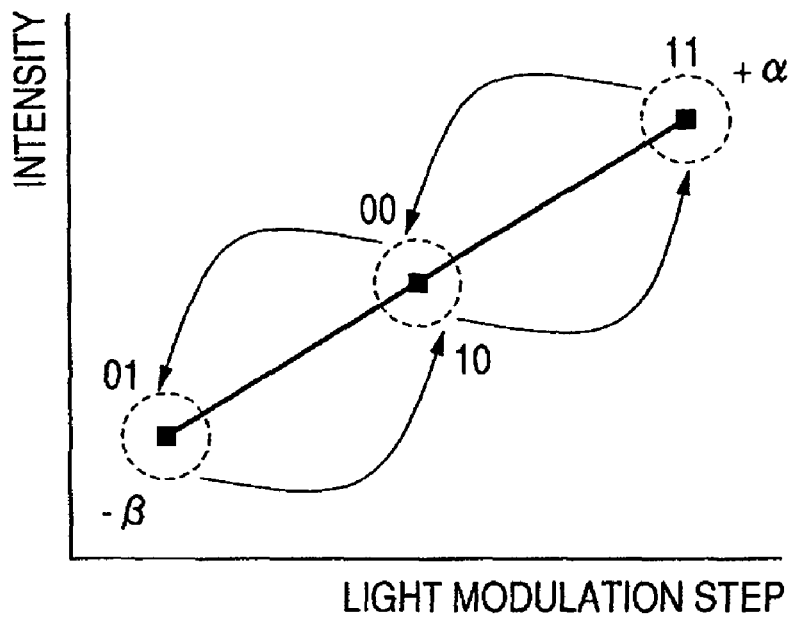
FIG. 11 is a chart showing an example of light intensity change in a power LCD setting.

Also, the operations shown in FIG. 9 are repetitions of transitions from intermediate intensity, maximum intensity, intermediate intensity, minimum intensity, to intermediate intensity. However, there may also be adopted a transition sequence from intermediate intensity, minimum intensity, intermediate intensity, maximum intensity, to intermediate intensity as shown in FIG. 11. This is easily achievable in the flow chart shown in FIG. 5, by changing the step 202 so as to read the control signal for the minimum intensity instead of reading the control signal for the maximum intensity, and by changing the step 203 so as to read the control signal for the maximum intensity instead of reading the control signal for the minimum intensity.

Figure 6:
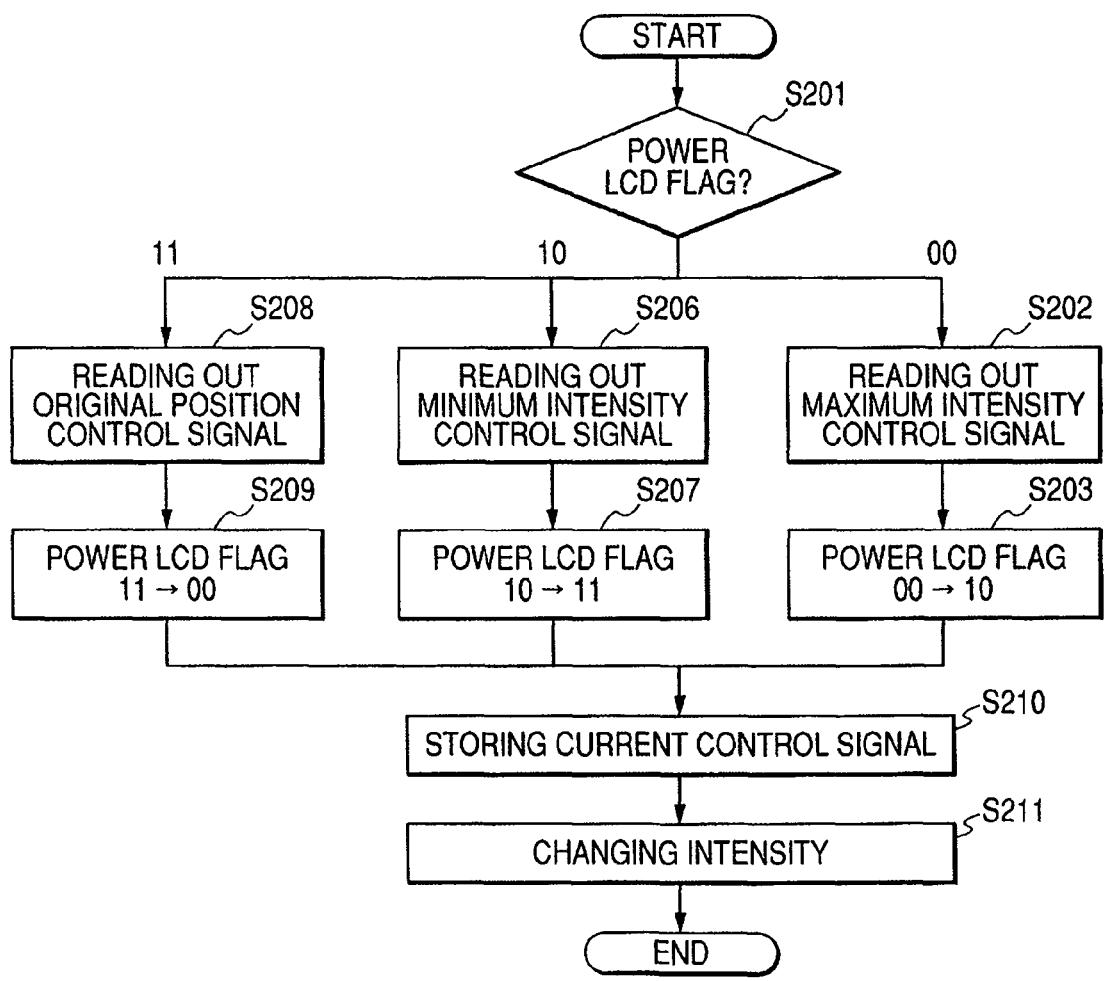
FIG. 6 is a flow chart showing a power LCD setting as a subroutine of FIG. 4.
Figure 12:
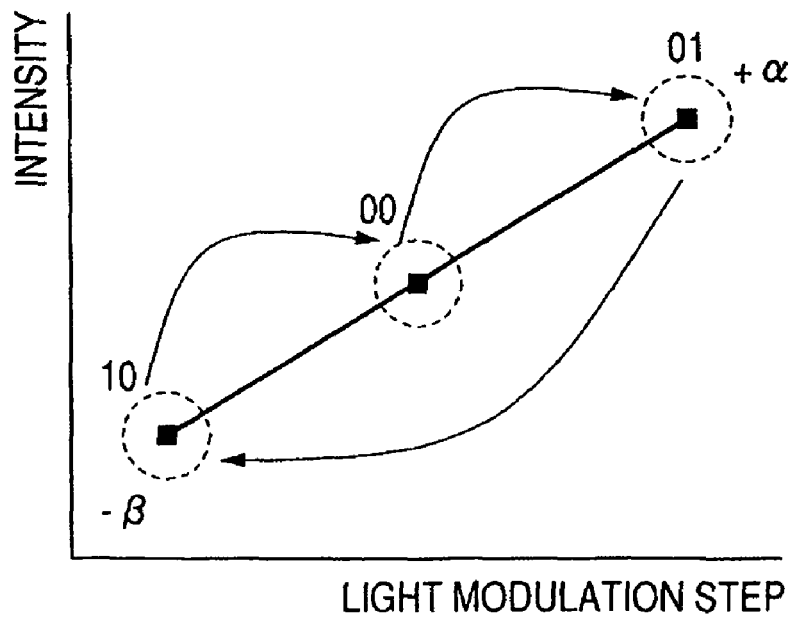
FIG. 12 is a chart showing an example of light intensity change in a power LCD setting.
Figure 13:
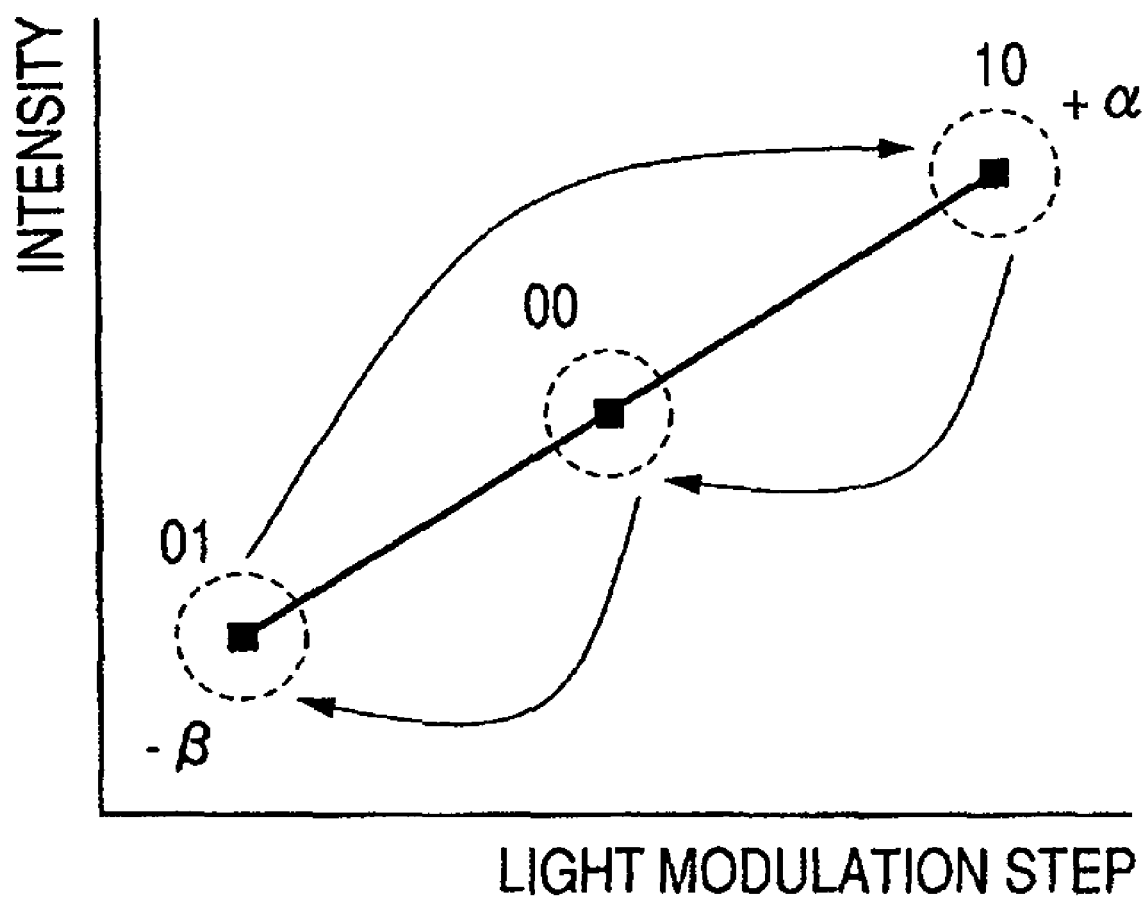
FIG. 13 is a chart showing an example of light intensity change in a power LCD setting.

Also, a repetition of three transitions from intermediate intensity, maximum intensity, minimum intensity, to intermediate intensity as shown in FIG. 12 can be easily realized, by changing the flow chart shown in FIG. 5 as shown in FIG. 6. Also, a repetition from intermediate intensity, minimum intensity, maximum intensity, to intermediate intensity as shown in FIG. 13 can be easily realized.

The light intensity change explained above is executed on a display apparatus having a backlight, and is therefore applicable not only to a digital camera but also a personal computer, a mobile phone, a facsimile apparatus, a copying apparatus and the like.

Figure 7:
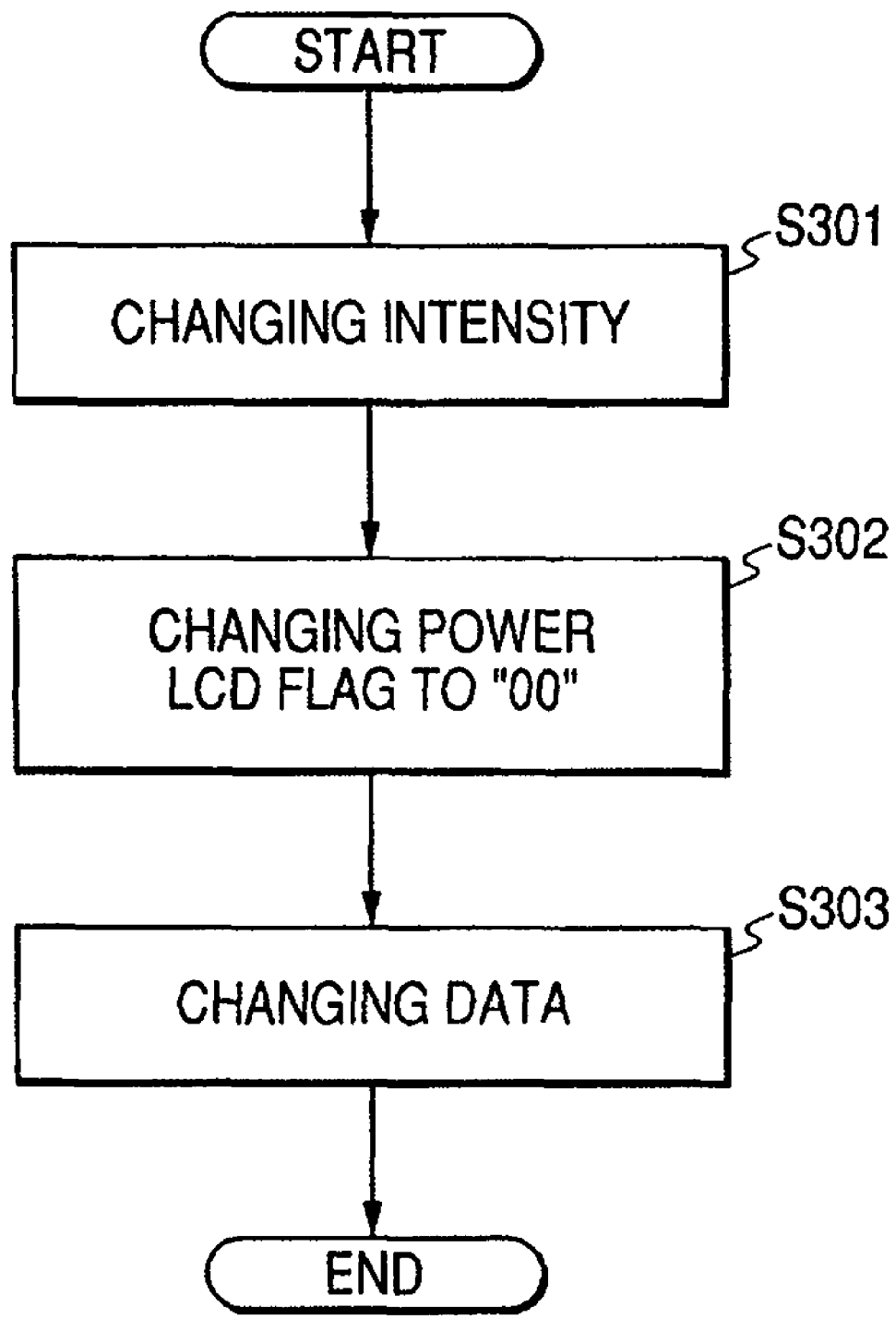
FIG. 7 is a flow chart showing a backlight intensity modulation setting subroutine of FIG. 4.

In the following, a backlight intensity modulation setting subroutine step S104 shown in FIG. 4 will be explained with reference to FIG. 7. When the backlight intensity modulation is selected by the operator, an intensity change is executed (step S301), and a power LCD flag stored in the flash memory 51 is updated to "00" (step S302). Thus, when the backlight intensity modulation setting is selected after the power LCD setting in step S103, the power LCD setting is cancelled. Then at step S303, the current control signal is stored, and the sequence is terminated. Steps S301 to S303 may be executed in different sequence without affecting the backlight intensity modulation.

Figure 8:
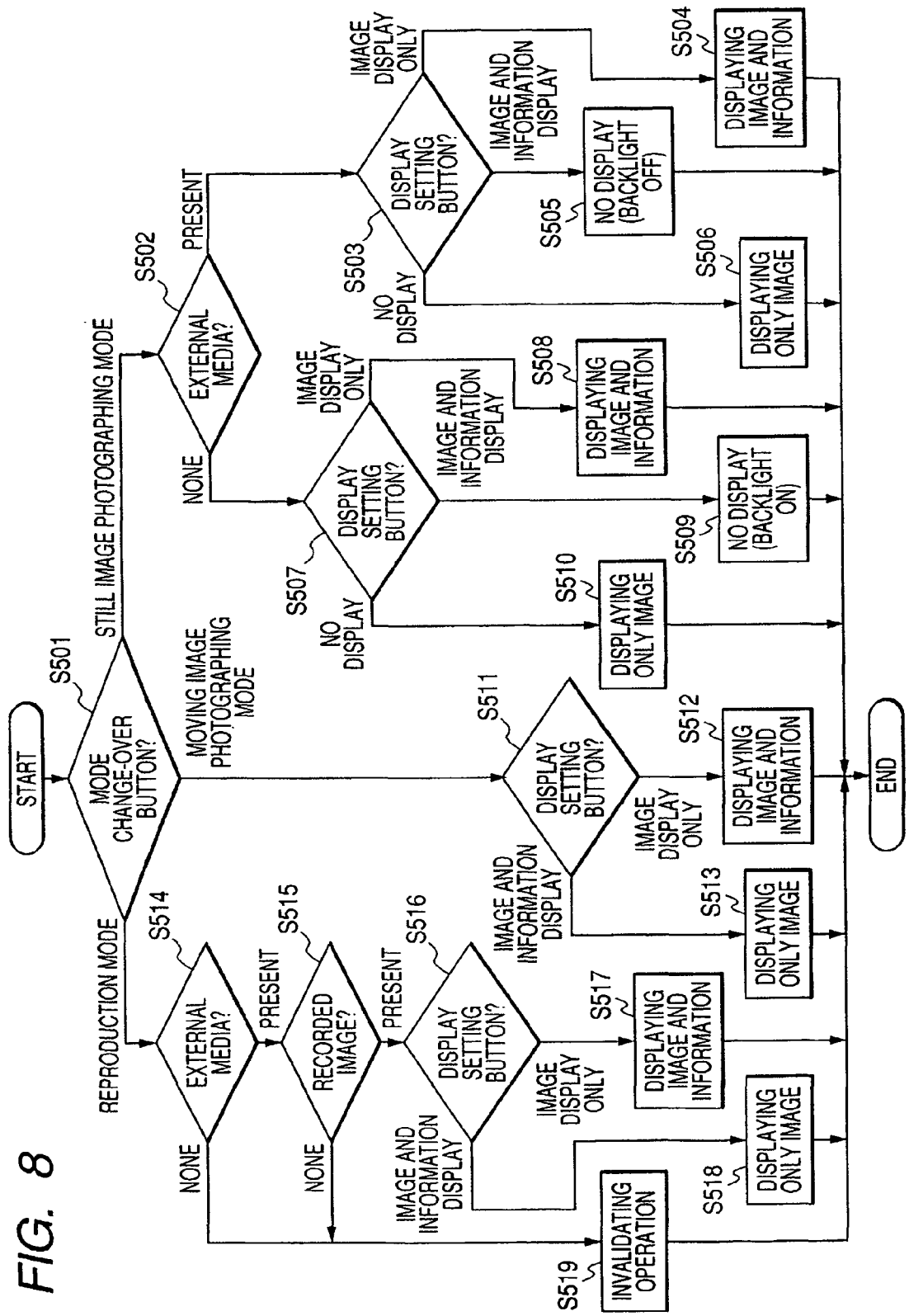
FIG. 8 is a flow chart showing a display setting subroutine of FIG. 4.

In the following, the display setting subroutine step S105 shown in FIG. 4 will be explained with reference to FIG. 8. When the display setting is selected by the operator, at first a state of the mode change-over switch is confirmed (step S501). The sequence proceeds to step S502, S511 and S514 in accordance with a still image capture mode, a moving image capture mode and a reproduction mode, respectively.

At step S502, it is confirmed whether an external memory is inserted into the external memory slot 52, and then the sequence proceeds to step S503 or step S507 respectively depending on whether the external memory is inserted or not. At step S503, a current display setting mode is confirmed, and if the display apparatus 10 is in a state of displaying an image only, the display apparatus is set to display image and information (step S504). If in step S503 it is discriminated that the display apparatus 10 is in a state of displaying image and information, then display of nothing is set, whereby the central processing unit 22 deactivates the backlight drive circuit 14, thereby terminating the drive of the backlight 12 (step S505). If in step S503 it is discriminated that a state of display is nothing, it sets a state of displaying image only (step S506).

At step S507, a current display setting mode is confirmed, and if the display apparatus 10 is in a state of displaying an image only, the display apparatus is set to display image and information (step S508). If in step S507 it is discriminated that the display is in a state of displaying image and information, it turns off the image signal but continues driving the backlight (step S509). In this state the display apparatus 10 does not display an image signal, but can display information such as a non-inserted state of the external medium, thereby giving a warning to a user of the main body. If at step S507 it is discriminated that the display is in a state of displaying nothing, it sets the display for display of image only (step S510).

In the following, there will be explained a flow chart of a moving image capture mode set in step S501. At step S511 the current display setting mode is confirmed, and if the display apparatus 10 is in a state of displaying an image only, the display apparatus is set to display image and information (step S512). If in step S511 it is discriminated that the display apparatus 10 is in a state of displaying image and information, it sets a state of displaying image only (step S513). In the moving image capture mode, image is always displayed since only the display apparatus 10 is available for displaying information such as a recording time or a set mode, which the user wishes to know when the image display is turned off. As long as such display is possible, a state with no image display may be selected in the display setting. Such situation can be realized by a flow chart identical with the steps for the still image capture mode started from the branch in step S501.

In the following, there will be explained a flow chart of a reproduction mode setting selected in step S501. In the digital camera of the present embodiment, it is assumed that the image is stored only in the external medium. At step S514, it is confirmed whether the external memory is inserted in the external memory slot 52, and, if inserted, the sequence proceeds to step S515. At step S515, images stored in the external memory is checked, and the sequence proceeds to step S516 if at least one image is stored. At step S516, the current display setting mode is confirmed, and if the display apparatus 10 is in a state of displaying image only, it sets the display for image and information (step S517). If in step S516 a state of displaying image and information is discriminated, it sets the display for displaying image only (step S518). If in step S514 it is discriminated that the external memory is not inserted in the external memory slot 52 or if the external memory, even if inserted, does not store any images, the sequence proceeds to step S519 to invalidate the operations and to terminate the sequence.

The present embodiment has been explained as an operation of a digital camera, but the present invention is also applicable to a configuration without the image capture apparatus 30. In such case, in the display setting subroutine shown in FIG. 8, the still image capture mode and the moving image capture mode may be excluded from the branching in step S501.

Also, the foregoing embodiment has been explained as a case in which the maximum or minimum light intensity is set by setting the Power LCD Mode, but it is not limited to a minimum or maximum intensity but may have a certain tolerance. For example with reference to FIG. 3, the maximum intensity may also include a value somewhat smaller than +7, such as +6.5, and the minimum intensity may also include a value somewhat larger than −7, such as −6.5.

Also, the foregoing embodiment explained a case of switching over the Power LCD Mode and the display setting mode according to the depression time of the display setting button 42, but it is also possible to provide an exclusive button for setting the Power LCD Mode. Such exclusive button dispenses with the discrimination for the long-time depression of the button in step S107 in FIG. 4, thereby simplifying the process.

The present invention can also be achieved by providing a storage medium storing program codes for performing the aforesaid processes to an image sensing system or apparatus, reading the program codes by a CPU or an MPU (main processing unit) of the image reproduction apparatus, from the storage medium, then executing the program. In this case, the program codes read from the storage medium realize the functions according to the embodiments, and the storage medium storing the program codes constitutes the invention. The storage medium for supplying the program codes can be, for example, a flexible disk, a hard disk, an optical disk, a magneto-optical disk, a CD-ROM, a CD-R, a magnetic tape, a non-volatile type memory card, a ROM or a DVD.

Furthermore, besides the aforesaid functions according to the above embodiments realized by executing the program codes which are read by a CPU of the image reproduction apparatus, the present invention includes a case where an OS (operating system) or the like working on the computer performs entire processes or a part thereof in accordance with designations of the program codes and realizes functions according to the above embodiments.

Furthermore, the present invention also includes a case where, after the program codes read from the storage medium are written in a function expansion card which is inserted into the image reproduction apparatus or in a memory provided in a function expansion unit which is connected to the image reproduction apparatus, CPU or the like contained in the function expansion card or unit performs a part or entire process in accordance with designations of the program codes and realizes functions of the above embodiments.

The present invention allows for changing the light intensity of the display unit to a desired one by a simple operation, and also to inhibit the thus set intensity from being reset to the original intensity against the will of the user.

The scope of the present invention is defined by the scope of the appended claims and is not limited to only the specific description in this specification. Furthermore, all the modifications and changes belonging to equivalents of the claims are considered to fall within the scope of the present invention.

What is claimed is:

1. A portable electronic equipment comprising:
a display panel capable of displaying an image thereon;
a setting unit configured to set an intensity of the display panel to one of a plurality of grades including maximum, minimum and at least one intermediate intensities step by step in accordance with an instruction from a user;
a recording control unit configured to control recording the intensity set by the setting unit, on a nonvolatile recording medium; and
a control unit configured to control the display panel such that:
the intensity of the display panel is switched to the intensity set by the setting unit that is recorded on the nonvolatile recording medium by the recording control unit, when a main electric power of the portable electronic equipment is turned on;
the display panel effects display with the maximum intensity, which is not set by the setting unit but is originally recorded on the nonvolatile recording medium, irrespectively of the intensity set by the setting unit that is recorded on the nonvolatile recording medium by the recording control unit, if a single operation member is operated once by the user in a predetermined operation manner when the display panel effects the display with the intensity set by the setting unit; and
the maximum intensity caused by the operation of the single operation member in the predetermined operation manner is switched to the intensity set by the setting unit that is recorded on the nonvolatile recording medium by the recording control unit before the display panel effects the display with the maximum intensity, if the single operation member is re-operated once by the user in the same predetermined operation manner when the display panel effects the display with the maximum intensity.

2. A portable electronic equipment according to claim 1, wherein the single operation member is an operation button member, and the predetermined operation manner is that the operation button member is continuously depressed for more than a predetermined time period,
the portable electronic equipment further comprising a determining unit configured to determine whether the operation button member is continuously depressed for more than the predetermined time period.

3. A portable electronic equipment according to claim 2, further comprising a display mode switch-over unit configured to switch over a current display mode of the display panel to other display mode thereof for displaying information different from that displayed in the current display mode, if the determining unit determines that the operation button member is continuously depressed for a time period shorter than the predetermined time period when the display panel effects the display with the intensity set by the setting unit.

4. A portable electronic equipment according to claim 1, wherein the control unit controls the display panel so as to cause the display panel not to effect the display with the maximum intensity but instead to effect the display with the intensity set by the setting unit, if the main electric power of the portable electronic equipment is turned off and thereafter turned on again when the display panel effects the display with the maximum intensity irrespectively of the intensity set by the setting unit.

5. A portable electronic equipment according to claim 1, further comprising an image pickup unit and a display control unit configured to control to display an image picked up by the image pickup unit on the display panel.

6. A portable electronic equipment according to claim 1, wherein the display panel is a liquid crystal panel and includes a backlight for irradiating the liquid crystal panel from the rear side thereof, and wherein the setting unit and the control unit control the intensity of the liquid crystal panel by controlling an amount of light radiated by the backlight.

7. A control method for a portable electronic equipment including a display panel capable of displaying an image thereon, comprising the steps of:

setting an intensity of the display panel to one of a plurality of grades including maximum, minimum and at least one intermediate intensities step by step in accordance with an instruction from a user;

controlling to record the intensity set by the setting unit, on a nonvolatile recording medium; and controlling the display panel such that:

the intensity of the display panel is switched to the intensity set in the setting step that is recorded on the nonvolatile recording medium in the recording control step, when a main electric power of the portable electronic equipment is turned on;

the display panel effects display with the maximum intensity that is not set in the setting step but is originally recorded on the nonvolatile recording medium, irrespectively of the intensity set in the setting step that is recorded on the nonvolatile recording medium in the recording control step, if a single operation member is operated once by the user in a predetermined operation manner when the display panel effects the display with the intensity set in the setting step; and the maximum intensity caused by the operation of the single operation member in the predetermined operation manner is switched to the intensity set in the setting step that is recorded on the nonvolatile recording medium in the recording control step before the display panel effects the display with the maximum intensity, if the single operation member is re-operated once by the user in the same predetermined operation manner when the display panel effects the display with the maximum intensity.

8. A computer-readable storage medium storing a computer-executable program comprising a program code for causing a computer to execute a control method for a portable electronic equipment including a display panel capable of displaying an image thereon, the control method comprising the steps of:

setting an intensity of the display panel to one of a plurality of grades including maximum, minimum and at least one intermediate intensities step by step in accordance with an instruction from a user;

controlling to record the intensity set by the setting unit, on a nonvolatile recording medium; and controlling the display panel such that:

the intensity of the display panel is switched to the intensity set in the setting step that is recorded on the nonvolatile recording medium in the recording control step, when a main electric power of the portable electronic equipment is turned on;

the display panel effects display with the maximum intensity that is not set in the setting step but is originally recorded on the nonvolatile recording medium, irrespectively of the intensity set in the setting step that is recorded on the nonvolatile recording medium in the recording control step, if a single operation member is operated once by the user in a predetermined operation manner when the display panel effects the display with the intensity set in the setting step; and the maximum intensity caused by the operation of the single operation member in predetermined operation manner is switched to the intensity set in the setting step that is recorded on the nonvolatile recording medium in the recording control step before the display panel effects the display with the maximum intensity, if the single operation member is re-operated once by the user in the same predetermined operation manner when the display panel effects the display with the maximum intensity.

9. A portable electronic equipment comprising:

a display unit capable of displaying an image thereon;

a setting unit configured to set an intensity of the display panel to one of a plurality of grades including maximum, minimum and at least one intermediate intensities step by step in accordance with an instruction from a user;

an operation button member;

a discriminating unit configured to discriminate whether the operation button unit remains being depressed for more than predetermined time; and a control unit configured to effect control in accordance with a result of a discrimination by the discriminating unit so as to perform an operation mode in which the display unit effects display with the maximum intensity that is not set by the setting unit in accordance with the instruction from the user but is originally set in the portable electronic equipment, irrespectively of the intensity set by the setting unit, if the discriminating unit discriminates that the operation button member remains being depressed for more than the predetermined time when the display unit effects the display with the intensity set by the setting unit, to perform a function other than the operation mode if the operation button member operated to be released from being depressed before the discriminating unit discriminates that the button operation member remains being depressed for more than the predetermined time when the display unit effects the display with the intensity set by the setting unit, and to switch the maximum intensity to the intensity that was set by the setting unit to be recorded on a recording medium and was used to effect the display by the display unit immediately before switching to the maximum intensity, if the discriminating unit discriminates that the operation button member remains being depressed for more than the predetermined time when the display unit effects the display with the maximum intensity irrespectively of the intensity set by the setting unit.

10. A portable electronic equipment according to claim 9, wherein the function other than the operation mode is a function having nothing to do with adjustment of the intensity of the display unit.

11. A control method for a portable electronic equipment including a display unit capable of displaying an image thereon and an operation button member, comprising the steps of:

setting an intensity of the display panel to one of a plurality of grades including maximum, minimum and at least one intermediate intensities step by step in accordance with an instruction from a user;

discriminating whether the operation button unit remains being depressed for more than predetermined time; and effecting control in accordance with a result of a discrimination in the discriminating step so as to perform an operation mode in which the display unit effects display with the maximum intensity that is not set in the setting step in accordance with the instruction from the user but is originally set in the portable electronic equipment, irrespectively of the intensity set in the setting step, if the discriminating step discriminates that the operation button member remains being depressed for more than the predetermined time when the display unit effects the display with the intensity set in the setting step, to perform a function other than the operation mode if the operation button member operated to be released from being depressed before the discriminating step discriminates that the button operation member remains being depressed for more than the predetermined time when the display unit effects the display with the intensity set in the setting step, and to switch the maximum intensity to the intensity that was set in the setting step to be recorded on a recording medium and was used to effect the display by the display unit immediately before switching to the maximum intensity, if the discriminating step discriminates that the operation button member remains being depressed for more than the predetermined time when the display unit effects the display with the maximum intensity irrespectively of the intensity set by the setting unit.

12. A computer-readable storage medium storing a computer-executable program comprising a program code for causing a computer to execute a control method for a portable electronic equipment including a display unit capable of displaying an image thereon and an operation button member, the control method comprising the steps of:
  setting an intensity of the display panel to one of a plurality of grades including maximum, minimum and at least one intermediate intensities step by step in accordance with an instruction from a user;
  discriminating whether the operation button unit remains being depressed for more than predetermined time; and
  effecting control in accordance with a result of a discrimination in the discriminating step so as to perform an operation mode in which the display unit effects display with the maximum intensity that is not set in the setting step in accordance with the instruction from the user but is originally set in the portable electronic equipment, which is not set by the setting unit but is originally set in the portable electronic equipment, irrespectively of the intensity set in the setting step, if the discriminating step discriminates that the operation button member remains being depressed for more than the predetermined time when the display unit effects the display with the intensity set in the setting step, to perform a function other than the operation mode if the operation button member operated to be released from being depressed before the discriminating step discriminates that the button operation member remains being depressed for more than the predetermined time when the display unit effects the display with the intensity set in the setting step, and to switch the maximum intensity to the intensity which was set in the setting step to be recorded on a recording medium and was used to effect the display by the display unit immediately before switching to the maximum intensity, if the discriminating step discriminates that the operation button member remains being depressed for more than the predetermined time when the display unit effects the display with the maximum intensity irrespectively of the intensity set by the setting unit.

13. A portable electronic equipment according to claim 1, wherein the control unit controls the display panel so as to switch the intensity thereof to the minimum intensity, which is not set by the setting unit but is originally set in the portable electronic equipment, if the single operation member is re-operated once by the user in the same predetermined manner after the single operation member is re-operated once by the user in the same predetermined operation manner to switch the intensity of the display panel from the maximum intensity to the intensity set by the setting unit that is recorded on the nonvolatile recording medium by the recording control unit, and to switch the intensity of the display panel to the intensity set by the setting unit that is recorded on the nonvolatile recording medium by the recording control unit, if the single operation member is re-operated once by the user in the same predetermined manner when the display panel effects the display with the minimum intensity.

* * * * *